United States Patent
Warsop et al.

(10) Patent No.: US 9,725,172 B2
(45) Date of Patent: Aug. 8, 2017

(54) SURVEILLANCE SYSTEM

(71) Applicant: BAE SYSTEMS plc, London (GB)

(72) Inventors: Clyde Warsop, Lydney (GB); Andrew Julian Press, Bradley Stoke (GB); Alan Geraint Davies, Brislington (GB)

(73) Assignee: BAE SYSTEMS plc, London (GB)

( * ) Notice: Subject to any disclaimer, the term of this patent is extended or adjusted under 35 U.S.C. 154(b) by 164 days.

(21) Appl. No.: 14/370,178

(22) PCT Filed: Dec. 5, 2012

(86) PCT No.: PCT/GB2012/053009
§ 371 (c)(1),
(2) Date: Jul. 1, 2014

(87) PCT Pub. No.: WO2013/102750
PCT Pub. Date: Jul. 11, 2013

(65) Prior Publication Data
US 2015/0142210 A1    May 21, 2015

(30) Foreign Application Priority Data
Jan. 3, 2012 (GB) .................................. 1200022.0

(51) Int. Cl.
*B64C 39/02* (2006.01)
*F42B 12/36* (2006.01)
(Continued)

(52) U.S. Cl.
CPC .............. *B64C 39/028* (2013.01); *B64C 3/56* (2013.01); *B64C 5/06* (2013.01); *B64C 9/08* (2013.01);
(Continued)

(58) Field of Classification Search
None
See application file for complete search history.

(56) References Cited

U.S. PATENT DOCUMENTS 3,433,441 A * 3/1969 Cummings ........... B64C 31/036
                                                                244/138 R
3,962,537 A    6/1976 Kearns et al.
(Continued)

FOREIGN PATENT DOCUMENTS

DE    102008050377 A1    4/2010
EP       0447080 A1    8/1991
(Continued)

OTHER PUBLICATIONS

Rysdyk, Rolf. "UAV path following for constant line-of-sight." 2th AIAA Unmanned Unlimited. Conf. and Workshop and Exhibit, San Diego, CA. 2003.*
(Continued)

*Primary Examiner* — Jerrah Edwards
*Assistant Examiner* — Donald J Wallace
(74) *Attorney, Agent, or Firm* — Finch & Maloney PLLC

(57) ABSTRACT

The invention relates to a launched aerial surveillance vehicle, more specifically to a grenade or under-slung grenade launcher (UGL) aerial surveillance vehicle, a surveillance system and methods of providing rapid aerial surveillance.

The vehicle once deployed is capable of autonomous flight paths, with basic inputs to change the circular flight paths, so as to build up surveillance for an area of interest. The vehicle comprises at least one optical sensor, which may be IR or visible range, to survey the area of interest, and feed the images back to at least one remote user.

20 Claims, 3 Drawing Sheets

(51) Int. Cl.
| | |
|---|---|
| F42B 15/08 | (2006.01) |
| B64C 3/56 | (2006.01) |
| B64C 5/06 | (2006.01) |
| B64C 9/08 | (2006.01) |
| B64F 1/04 | (2006.01) |
| G05D 1/00 | (2006.01) |

(52) U.S. Cl.
CPC .............. *B64F 1/04* (2013.01); *F42B 12/365* (2013.01); *F42B 15/08* (2013.01); *G05D 1/0011* (2013.01); *G05D 1/0088* (2013.01); *G05D 1/0094* (2013.01); *B64C 2201/08* (2013.01); *B64C 2201/123* (2013.01); *B64C 2201/145* (2013.01); *B64C 2201/146* (2013.01)

(56) References Cited

U.S. PATENT DOCUMENTS

| | | | | |
|---|---|---|---|---|
| 4,375,280 | A * | 3/1983 | Nicolaides | B64C 31/024 244/13 |
| 4,659,041 | A | 4/1987 | Dellinger et al. | |
| 4,860,970 | A * | 8/1989 | Roselli | B64C 31/036 244/16 |
| 4,934,630 | A * | 6/1990 | Snyder | B64C 31/036 244/13 |
| 5,160,100 | A * | 11/1992 | Snyder | B64C 31/036 244/13 |
| 5,395,073 | A * | 3/1995 | Rutan | B64C 3/385 244/38 |
| 5,467,681 | A | 11/1995 | Liberman | |
| 6,119,976 | A * | 9/2000 | Rogers | B64C 39/024 244/13 |
| 6,392,213 | B1 | 5/2002 | Martorana et al. | |
| 6,758,442 | B2 * | 7/2004 | Bailey | B64D 17/34 244/142 |
| 6,783,096 | B2 * | 8/2004 | Baldwin | B64C 11/001 244/12.4 |
| 6,808,144 | B1 * | 10/2004 | Nicolai | B64C 39/024 244/139 |
| 7,059,570 | B2 * | 6/2006 | Strong | B64D 17/343 244/147 |
| 7,467,762 | B1 | 12/2008 | Parsons | |
| 7,679,037 | B2 | 3/2010 | Eden et al. | |
| 8,001,901 | B2 * | 8/2011 | Bass | F42B 12/365 102/347 |
| 8,115,149 | B1 * | 2/2012 | Manole | F42B 10/18 102/430 |
| 2002/0070315 | A1 * | 6/2002 | Hilliard | B64D 17/025 244/139 |
| 2002/0193941 | A1 | 12/2002 | Jaeckle et al. | |
| 2003/0111564 | A1 | 6/2003 | Kuo | |
| 2008/0276821 | A1 | 11/2008 | Stancil | |
| 2009/0045284 | A1 | 2/2009 | Chu | |
| 2010/0057285 | A1 | 3/2010 | Murphy et al. | |
| 2010/0230547 | A1 * | 9/2010 | Tayman | B64C 27/24 244/7 C |
| 2010/0282897 | A1 | 11/2010 | de la Torre | |
| 2015/0268337 | A1 * | 9/2015 | Moe | G01S 13/04 701/2 |

FOREIGN PATENT DOCUMENTS

| | | |
|---|---|---|
| EP | 0800052 A2 | 10/1997 |
| EP | 1573266 A1 | 9/2005 |
| GB | 2246420 A | 1/1992 |
| WO | 2004057263 A1 | 7/2004 |
| WO | 2013102750 A1 | 7/2013 |

OTHER PUBLICATIONS

International Preliminary Report on Patentability and the Written Opinion of the International Searching Authority received for Patent Application No. PCT/GB2012/053009, mailed on Jul. 17, 2014, 7 pages. 3 pages.
International Search Report received for Patent Application No. PCT/GB2012/053009, mailed on Mar. 19, 2013, 3 pages.
GB Intellectual Property Office Search Report under Section 17(5) received for GB Patent Application No. 1200022.0 mailed May 3, 2012, 3 pages.
Alptekin, et al., "Development of a Flying Eye: A Project Based Learing Experience," published by California Polytechnic State University, 2005, 12 pages.
DeTurris, et al., "Development of an Autonomous Tactical Reconnaissance Platform," published by California Polytechnic State University, 2007, 17 pages.
D'Angelo, et al., "Video Imaging Projectiles for Future Battlefields," published by Field Artillery—A Professional Bulletin for Redlegs, Feb. 1994, pp. 46-49.
Hallam, Cory, R.A., "Systems, Aerodeceleration, and Structural Design of a High-G, Rapid Response, Deployable Autonomous Aerial Surveillance Vehicle," published by Department of Aeronautics and Astronautics—Massachusetts Institute of Technology, May 1997, pp. 1-179.
Dornhelm, Michael, A., "Industry Outlook," Aviation Week & Space Technology. May 17, 1993. p. 19.

* cited by examiner

SURVEILLANCE SYSTEM

The following invention relates to a launched aerial surveillance vehicle, more specifically to a grenade or underslung grenade launcher (UGL) aerial surveillance vehicle, a surveillance system and methods of providing rapid aerial surveillance.

UGLs are devices which are located underneath conventional guns, to launch a grenade. The grenade may contain high explosive payloads, smoke or other obscurants.

US2010/0057285 and EP0800052 are directed to mortar and artillery launched surveillance systems, respectively. Artillery and mortar launched systems are typically large calibre systems, typically of the order of at least 80 mm diameter, which require significant deployment systems such as a barrel or mortar tube and typically at least two operatives to deploy the round.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided a grenade launched aerial surveillance vehicle, comprising an integral propellant charge, whereupon launch said vehicle is launched from a grenade weapon,
wherein said surveillance vehicle comprises
a deployable wing
a guidance system comprising altitude lock to provide a substantially circular flight path around a target at a fixed GPS co-ordinate,
a means of providing directional nudge to the flight path,
an electrical power source,
at least one optical sensor, pivotally mounted on said vehicle,
communication device to relay guidance and data output from said at least one optical sensor to at least one remote user,
propulsion device for providing aerial movement of the vehicle,
a means for reducing the imparted spin on the vehicle prior to deployment of the surveillance vehicle located therein.

The grenade launcher may be a UGL on an infantry support weapon, mounted on a vehicle, vessel or craft, or a may form a single shot hand deployed grenade, similar to distress flare arrangement.

The use of a UGL launched round allows a vehicle which is encompassed in a fully integrated single munition, which is not reliant on specialist artillery equipment in order to launch the vehicle.

The vehicle according to the invention provides real-time, tactically significant and responsive visual surveillance information to Section/Platoon commanders over typical engagement ranges of 400-600 m, for several minutes duration. The vehicle is immediately deployable by the troops in the engagement area, without need for setting up a mortar tube or arranging for an artillery section to cease operations and provide a surveillance vehicle as described in the prior art.

The use of a mortar or artillery weapon during active combat is a valuable tool, and stopping a salvo of rounds to introduce a surveillance round to active theatre may afford loss of tactical advantage. However, a grenade launched vehicle, only requires one operative, who can deploy a round within a few seconds, rather than minutes for an artillery or mortar deployment. Typically the UGL is an add-on to a weapon, rather than the primary function, i.e. an assault weapon, and so the primary function is not compromised.

The ability to rapidly deploy the vehicle according to the invention thereby provides timely information without the requirement for tasking high-level reconnaissance assets. This aerial visual data aimed to provide information regarding potential enemy assets and equipment concealed out of line-of-sight, for example, within walled compounds.

Integral propellant charges are routine in grenade launched systems, this avoids the requirement of using a separate propellant charge and projectile, thereby reducing the burden of carrying a surveillance vehicle and separate charge.

Mortars and artillery rounds are subject to high pressures during launch, and are designed to launch projectiles with payloads in the order of kilograms. Therefore the casings of such projectiles are made from thick sections of metal, which add further mass to the system. Therefore a surveillance vehicle launched from such a system, encounters a significant weight penalty, and as such the vehicle portion will typically be housed in a launch canister, such that the vehicle inside needs to be deployed from the launch canister.

The grenade launched system uses much lower pressure systems, has a much lower mass per round, and hence the vehicle itself is launched without requirement of a launch canister or housing, to protect said vehicle from the launch pressures.

The at least one optical sensor may be selected from an IR camera, video camera, single shot camera, preferably a video camera. The optical sensor may be gyroscopically stabilised, specifically the stabilisation may compensate for roll attitude, preferably the optical sensor is a gyroscopically stabilised video camera.

The deployable wing may be selected from any collapsible wing, such as a parachute, parasail, parawing, inflatable wing. In a highly preferred arrangement the deployable wing is a parawing.

The parawing allows for a deployable wing that fits into a grenade sized projectile, and providing the stability and control constraints required for the vehicle. A parawing is steerable unlike typical parachutes and thus the parawing which can be packaged into such a small volume, unlike a fixed wing, provides aerodynamic efficiency, stability, control and overall design simplicity.

The parawing may be mounted at a fixed point on a trunion, which is pivotal about the vehicle casing, such that the trunion, pivots from a stowed position within the body of the vehicle to a deployed position which is exterior to the body of the vehicle. This allows the parawing to be affixed at a point exterior to the vehicle, which allows the ties of the parawing to be free from entanglement from internal components when in the deployed state.

A parawing is an inflatable wing that is pressurised by the dynamic pressure of the air in which it is operating and which is given span wise stiffness by means of an appropriately designed suspension harness that utilises the payload mass to provide both support and stiffness to the shape of the wing. A parawing is not an advanced form of parachute, it is a collapsible wing that has a high level of aerodynamic performance and a high level of natural stability and controllability. High performance parawings are able to achieve glide ratios in excess of 14:1, they have inherent natural stability which results from the fact that the heavy payload is suspended below the wing on thin but strong lines. The design of the support lines means that the wing/payload has inherent natural pendular stability and with correct layout of the rigging lines support and shaping of the wing is maintained during flight. The parawing has natural pendular stability and requires no additional aerodynamic surfaces to achieve stability The means of providing directional nudge to the flight path, such as for example, left, right, up, down, forwards, backwards, may be effected by nudging the wing of the device to a new circular path, this may be achieved by means of moveable rigging (brake) lines that can be operated to adjust the camber of the wing in either an asymmetric manner to effect a turn or in a symmetric manner to adjust angle of attack and hence flight speed.

Parawings may be self-deploying, requiring very little effort to inflate them to a stable configuration and once in flight can be designed such that partial collapse of the canopy due to overzealous piloting or gusts correct themselves automatically—thereby providing a degree of gust alleviation to the concept. A drogue chute may optionally be used to assist in deployment.

The propulsion device for providing aerial movement of the vehicle may be provided by known propulsion means, electric motors, IC motors, pyrotechnic rocket motors, chemical gas generators, compressed gas, more preferably electric motors, such as for example, remote control airplane, motors, preferably provided with foldable propellers.

The guidance system comprising altitude lock to provide a substantially circular flight path around a target at a fixed GPS co-ordinate. The deployed vehicle may follow a circular path around a general area of interest, in a preferred arrangement and to ensure that the image of the target is enhanced and more closely observed the vehicle may preferably be directed to follow a pivotal altitude about the target at a fixed GPS co-ordinate. The pivotal altitude is the altitude at which for a given flight speed and constant turn radius that the lateral axis of the air vehicle points at the centre of rotation point on the ground regardless of the turn radius.

The guidance may be incorporated into a section or platoon commander's control device. The control device may comprise separate viewing and controls, such, as for example viewing may be achieved by a head up display or hand display. The control may be provide by separate control means, preferably control and visual display may be provided on a game pad type or touch screen tablets. The controls may provide the input to the nudge guidance system, there may be further focussing or image capture (stills shot) functionality provided on the control device. The imagery data from the proposed vehicle may be subjected to image processing performed using existing video stabilisation software. The software is preferably installed and run on the operator's hand-held viewing device, rather than on board the vehicle, to reduce power requirements on the vehicle.

The communication device is located on the vehicle to relay guidance and data output from said at least one optical sensor to a remote user. The communication device may be any wireless communication such as for example, radio, wifi, optical to enable data transfer to the device. The data may be encrypted or unencrypted.

Grenade launchers typically rely on spin stabilisation to provide increased accuracy during launch. The vehicle according to the invention is required to be substantially free from roll or spin during wing deployment and subsequent flight operation. It is therefore desirable that the means for reducing the imparted spin be able to remove the spin within a short period of time. Such means are well known to those in the art, such as, for example slipping obturators or deployable fins, preferably the vehicle comprises at least two deployable fins, which deploy shortly after leaving the launch platform. The at least two fins provide stability of the vehicle during the powered flight stage of the surveillance.

The vehicle when launched may be deployed at several meters per second. It may be desirable for a drogue chute to be deployed to slow down the vehicle and additionally assist deployment of the deployable wing. The vehicle may need to be slowed to allow the pivotal attitude to be set up about a target position. The deployment of a drogue chute may be determined by a timer delay, remote operative deployment, peak altitude, or automated deployment based on trajectory, velocity and GPS position to determine the optimum point of deployment, preferably the GPS position is used to determine the optimum point of deployment.

In a preferred arrangement the vehicle comprises at least one self-destruct mechanism; to disable and render inoperable the electronic components, remove any cached data. The self-destruct may be caused via known means such as the use of a pyrotechnic charge to cause a fire to destroy the components, or a high electrical current may be passed through the components, such energy may be applied via a fast switching capacitor.

According to a further aspect of the invention there is provided a method for providing aerial surveillance of a target area, providing the steps of:

launching at least one vehicle as defined herein in the direction of the target area to be surveyed, determining a target and causing a first pivotal altitude to be maintained about said target at a first fixed GPS co-ordinate, monitoring the data from the at least one optical sensor, nudging the wing to set up a second pivotal altitude about a second target at a second fixed GPS co-ordinate, monitoring the data from the at least one optical sensor, optionally providing further nudges to provide further pivotal altitudes about a further target at a further fixed GPS co-ordinate, to provide a survey of the target area.

In a highly preferred arrangement the steps of launch, monitoring data and nudging the wing are undertaken by one operator. There may be more than one remote user, typically the images may be fed to multiple users so as to provide data to a number of operatives, i.e. those in active theatre and those at a command base who may be recording the data.

According to a further aspect of the invention there is provided a data surveillance system comprising a grenade launcher, at least one grenade launched aerial surveillance vehicle, and a control device. Preferably the control device may be capable of post processing the data from the optical sensor, such that there is image stabilisation applied to the data.

The nudge feature may be provided autonomously or by manual input from the operator. The use of autonomous steering, i.e. allowing the vehicle to plot and follow its own course according to a predetermined area to be surveyed will allow the operative to remain focussed on analysing the images without trying to control the vehicle.

Alternatively there may be more than one operative, such as, for example there may be a first operative proximate to the target who launches at least one grenade launched aerial surveillance vehicle and a second operative at a remote location who undertakes a survey of the area.

DETAILED DESCRIPTION

After launch and deployment of the stabilising fins the vehicle will transit via a ballistic trajectory to the point at which it transitions in various stages to its surveillance configuration. The proposed wrap-around fins will damp out the spin of the vehicle within one or two seconds and will provide sufficient directional stability to replace the gyroscopic stabilisation that would have been imparted by the spin rate. In order to provide sufficient directional stability via the proposed fins it will be essential to ensure that the centre of gravity of the components are well forward enough in the vehicle to provide sufficient static margin.

Upon initiation of the transition to surveillance mode a number of key events take place, such as for example deploy the parawing, uncover the camera lens, deploy the folding propellers and place the platform in a stable circular orbit. This may be controlled by a simple timer, initiated at launch, to signal the deployment sequence. Upon initiation of the sequence a mechanism, which may be driven by a small pyrotechnic charge, may unlatch the cylindrical outer casing of the vehicle and drive it rearwards by a distance of approximately 50 mm. At the same time this action will release the drop-out panels covering the bays containing the folding propeller blades and the folded parawing. It is anticipated that these panels will be jettisoned immediately after they are released from the vehicle body. Once the panels have been ejected the folding propellers and parawing will be deployed, typically by a simple integrated spring mechanism. The vehicle when it approaches its target may possibly still be travelling quite fast (up to 40 m/s) and that it may not be in an upright orientation. It may be convenient to employ a two-stage parawing deployment process. The first step may be the initial deployment of a very small drogue parachute to place the vehicle in a steady descent with an upright attitude, which should take in the order of a few seconds. Once this condition has been reached a second phase of deployment is initiated whereby the drogue parachute is used to deploy the parawing.

By virtue of the fact that the outer casing of the vehicle moved rearwards for parawing deployment it has also been designed so that this action also exposes the camera in its gimballed mounting. Thus, the proposed moving outer casing and ejectable panels provide a means of achieving a robust, hermetically sealed protection for all the internal components, during storage, ground handling and launch.

Retention of the stabilising fins during the parawing flight phase has significant benefit for stability of the camera platform. The rearward movement of the outer casing also has the effect of moving the stabilising fins further rearward and provides an even greater degree of stability of the camera platform suspended below the parawing.

The flying platform may operate at its pivotal altitude, the altitude at which for a given flight speed and constant turn radius the lateral axis of the aircraft points at the location on the ground about which the turn is centred. For a given flight speed there is a single altitude (the pivotal altitude) at which the lateral axis of the aircraft points directly at the centre of rotation point on the ground regardless of the radius of the turn. Aircraft pilots use this flying technique to carry out coordinated turns with respect to a fixed point on the ground.

The vehicle flight control system must maintain constant speed and altitude, a fixed camera angle within the airframe directed at the pre-defined centre-point of ground rotation results in an image that would rotate at the rotation speed of the vehicle's orbit around a fixed point in the centre of the image. This image would be useful to the operator providing it was not rotating too fast or preferably with the use of image processing software, be artificially made to appear quasi-stationary on the operators display.

If the flying platform was operating in a steady crosswind at a pivotal altitude and at constant speed and bank angle it would result in the orbit of the platform drifting with the prevailing wind, making continuous orbit about a fixed ground point difficult. The adoption of a variable bank angle technique is used by aircraft pilots in such circumstances when they wish to fly an orbit around a fixed ground point in such circumstances. As the aircraft flies in a circular orbit the pilot continuously adjusts the aircraft bank angle during the turn such that it is a minimum on the "into-wind" leg and at a maximum on the "down-wind" leg. Therefore the bank angle of the vehicle according to the invention would vary during the turn the camera requires a variable 'axis of look' preferably controlled by a heading lock gyroscope.

Once the parawing and folding propeller deployment phase has been completed the platform will be automatically programmed to enter a predetermined circling flight loiter mode, at a predefined altitude above ground with the camera actively pointed at the location on the ground about which the platform is circling. A simple on-board flight controller, based on simplified versions of current micro autopilot technology would provide appropriate station keeping with respect to a fixed ground location. The roll stabilised camera looking sideways and downwards from the vehicle may provide imagery for transmission back to the user. Changes in platform bank angle required to operate in windy conditions and due to sway of the platform due to gusts would be expected to be largely eliminated through gyroscopic stabilisation of the camera about the vehicle's roll axis.

The connection between the parawing and the camera may help to decouple the motions of the two components. The vehicle (and hence camera) are suspended from the parawing by a pivotal trunion mounting which is able to pivot about the pitch axis of the vehicle. This rigid trunion frame pivots about the centre of gravity of the vehicle (and camera) and enables an almost complete decoupling of the relative motions of the camera and the parawing about the pitch axis. Roll and yaw coupling between the parawing and the camera (vehicle) are minimised through the use of what are effectively "pin joints" where the parawing suspension lines attach to the top of the trunion frame. The effective "pin joints" decouple the motions of the parawing from the camera (vehicle), whereas stability of the camera (vehicle) in pitch and yaw is provided by means of its stabilising fins.

An embodiment of the invention will now be described by way of example only and with reference to the accompanying drawings of which:

Figure 1:
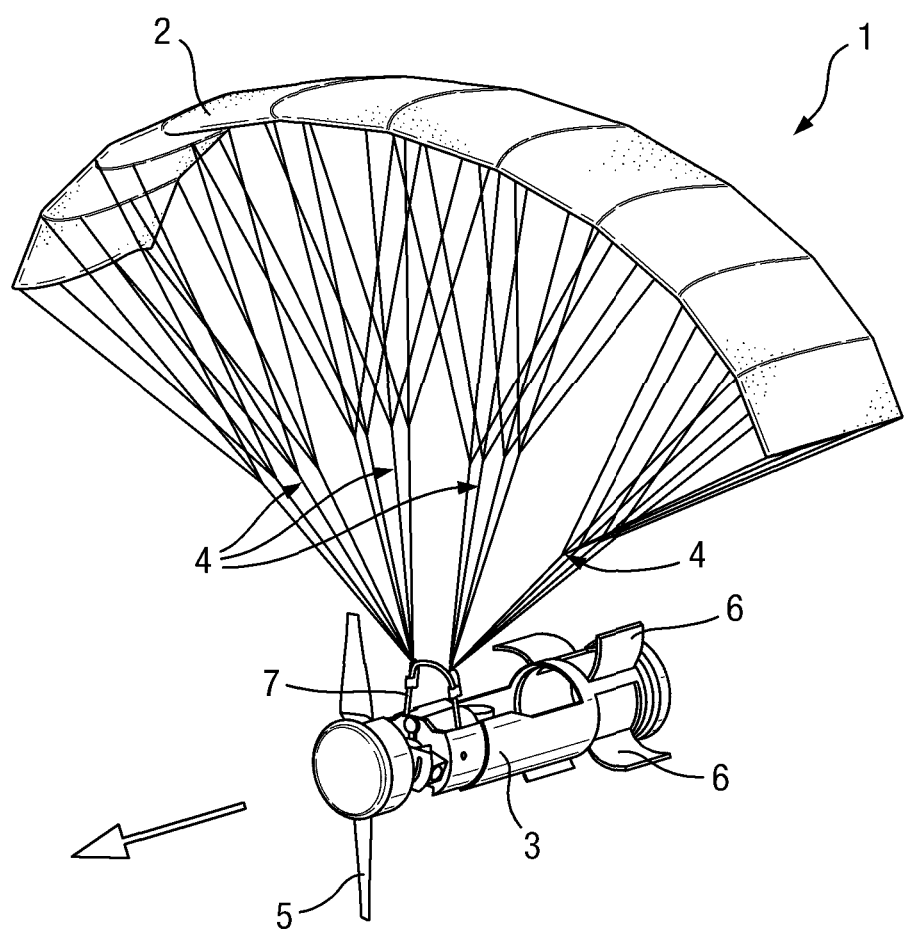
FIG. 1 shows a vehicle in a deployed state

Turning to FIG. 1, shows a surveillance device 1, with a vehicle 3 suspended from a parawing 2, via control lines 4. The vehicle 3 comprises a propeller 5 to provide forward flight, in the direction of the arrow. The vehicle 3 comprises a pivotal trunion 7, which in its deployed position as shown, is exterior to the outer surface of the vehicle casing 3. Control lines 4 are attached to the trunnion 7, and are held free from the internal components (not shown) of the vehicle 3. The vehicle 3 is stabilised during flight by deployable fins 6. The vehicle 3 is designed to be fired from a UGL launcher (not shown).

Figure 2A:
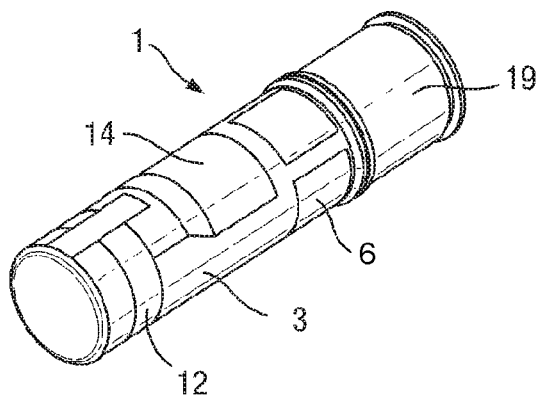
FIGS. 2a to 2d show the deployment sequence of the components, after launch
Figure 2B:
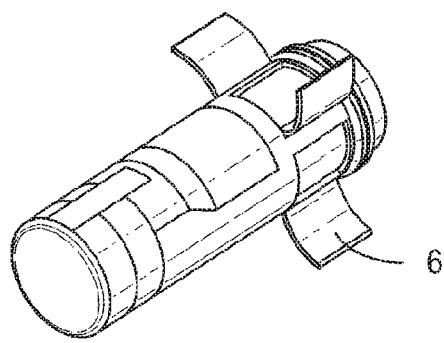
Figure 2C:
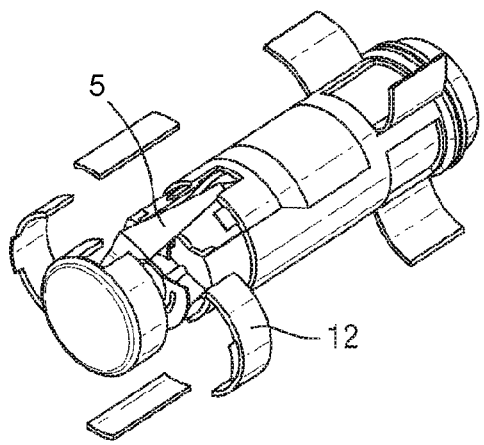
Figure 2D:
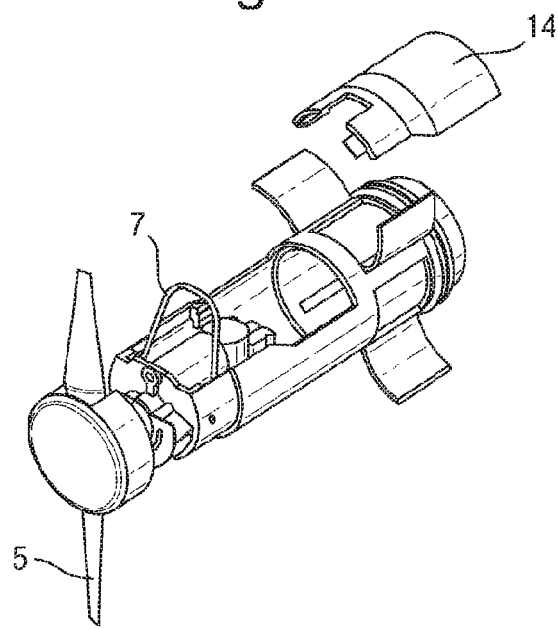

FIGS. 2a-d show a sequence of deployment from the launch configuration FIG. 2a, through to a deployed configuration 2d. In the launch configuration, a vehicle 3 forms a body of a device 1 that is fired from the grenade launcher. There are no additional housings or containers which house the vehicle 3. The launch propulsion is provided by a standard grenade launcher propellant cartridge 19, which during storage forms an integral part of the vehicle 3. During deployment the propellant cartridge 19 is fired by a launcher (not shown) which ejects the vehicle 3, as it would with a typical high explosive payload.

Most grenade launchers rely on spin stabilisation to control the accuracy of the round, however, the device 1 needs to have the imparted spin removed very quickly, otherwise deployment of the parawing will be unduly delayed. Deployable fins 6, in their launch configuration, are biased such that upon launch they move radially outwards into a deployed state. The fins 6 counteract the spinning moment on the vehicle 3.

At a selected time sacrificial panels 12 and 14 are ejected from the vehicle 3 such as for example by shearing retaining pins, to allow a propeller 5 to be deployed from a folded state to the final deployed state. Similarly a pivotal trunion 7 is then able to move to its deployed state. The deployment of the propeller 5 and trunion 7 may be effected by the use of biased components such that when the sacrificial panels 12, 14 are removed the propeller 5 and trunion 7 are urged into the deployed state. The parawing 2 has been removed for clarity.

Figure 3:
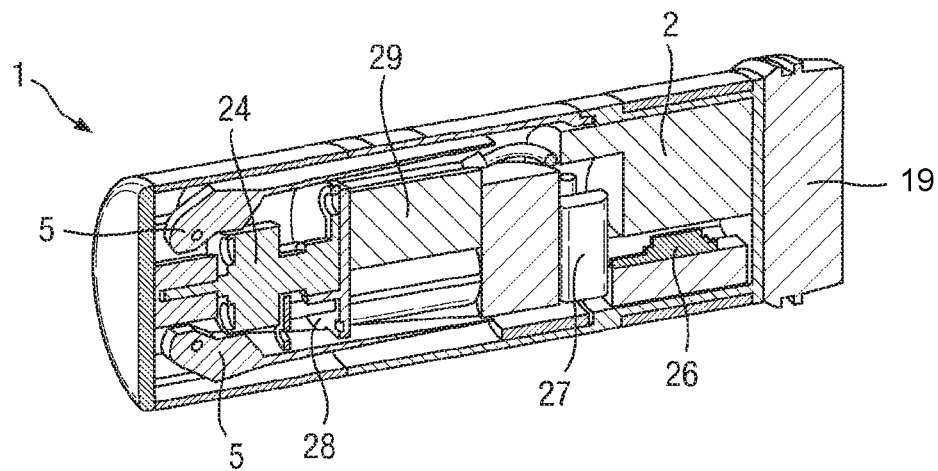
FIG. 3 shows a section through the vehicle in its launch configuration.

FIG. 3 shows a section of a device 1, with the components in their launch configuration. The device 1 comprises a propellant cartridge 19 at the rear end. At the fore end, there is a propeller 5 in a folded state. The propeller 5 is powered by an electric motor 24, which receives electrical energy from a battery 29. The battery 29 also provides electrical energy to power a video camera 28 and control servos 27, which control and steer the parawing 2 when in the deployed state. The control servos 27 are themselves activated by instructions from an autopilot system 26, which may be based on a GPS based technology.

Figure 4:
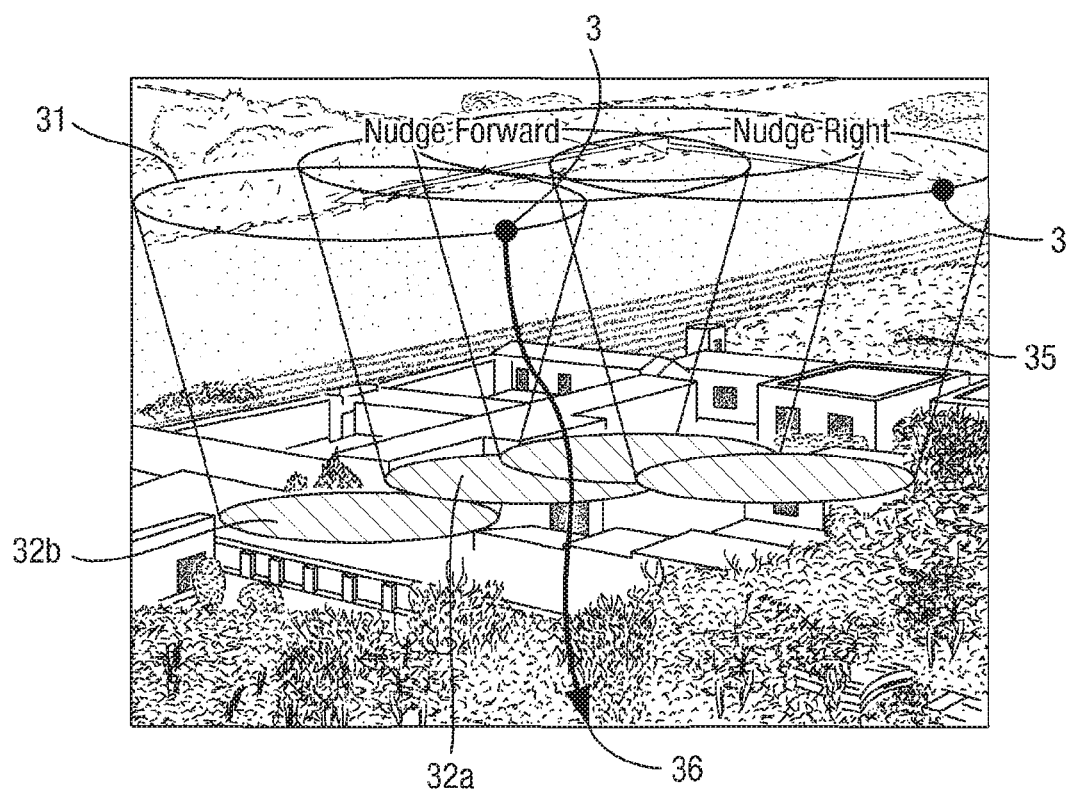
FIG. 4 shows an area to be surveyed, and a surveillance pattern.

FIG. 4 shows an area of interest 35 to be surveyed. A vehicle 3 is made to obtain a pivotal altitude 31b such that a camera (not shown) can provide surveillance of the area 32b. A parawing may be steered to nudge the vehicle 3 to a new pivotal altitude, such that a new surveillance area 32a may be surveyed. A series of pivotal altitudes may be set up during the flight, to provide a complete picture of the total area of interest 35. At the end of the flight the vehicle 3 is bought down and destroyed 36, preferably remote to the area of interest 35.

The invention claimed is:

1. A grenade launched aerial surveillance vehicle, comprising:
    an integral propellant charge, whereupon launch said surveillance vehicle is launched, by an operator, from a grenade launcher-weapon, wherein the operator comprises at least one visual display and at least one control device for operating said surveillance vehicle;
    a trunion pivotally mounted to the surveillance vehicle and configured to pivot from a stowed position within a body of the vehicle to a deployed position that is exterior to the body of the vehicle, and further configured to pivot about a pitch axis passing through a center of gravity of the surveillance vehicle while in the deployed position;
    a deployable wing connected to the trunnion;
    a guidance system comprising altitude lock to provide a substantially circular flight path around a target at a fixed GPS co-ordinate;
    a wing adjuster to provide directional nudge to the flight path;
    an electrical power source;
    at least one optical sensor, pivotally mounted on said surveillance vehicle;
    a communication device configured to relay guidance and data output from said at least one optical sensor to the operator;
    a propulsion device for providing aerial movement of the surveillance vehicle; and
    a spin inhibitor for reducing spin on the surveillance vehicle prior to a deployment of the deployable wing.

2. The surveillance vehicle according to claim 1, wherein the at least one optical sensor is a gyroscopically stabilised video camera, to compensate for roll attitude.

3. The surveillance vehicle according to claim 1, wherein the deployable wing is a parawing.

4. The surveillance vehicle according to claim 3, wherein the parawing is mounted at a fixed point on the pivotal trunion, and wherein the trunion is further configured to pivot about the pitch axis of the surveillance vehicle in response to a pitching motion of the surveillance vehicle after a deployment of the parawing for stabilizing the surveillance vehicle.

5. The surveillance vehicle according to claim 1, wherein during deployment the surveillance vehicle follows a pivotal altitude orbit about the target at a fixed GPS co-ordinate.

6. The surveillance vehicle according to claim 1, wherein the spin inhibitor comprises at least two deployable fins.

7. The surveillance vehicle according to claim 1, wherein the surveillance vehicle further comprises a drogue chute to slow down the round and deploy the deployable wing.

8. The surveillance vehicle according to claim 1, wherein the surveillance vehicle comprises a self-destruct mechanism, to at least one of disable electronic components and remove cached data.

9. The surveillance vehicle according to claim 1, further comprising a deployable stabilisation fin.

10. The surveillance vehicle according to claim 1, wherein the communication device is configured to relay guidance and data output from said at least one optical sensor to at least one other remote operator location comprising at least one visual display and at least one control device configured for remotely operating said surveillance vehicle by another user.

11. A method for providing aerial surveillance of a target area, of the method comprising:
    in response to a launch command, launching at least one surveillance vehicle according to claim 1 in the direction of the target area to be surveyed;
    determining a target and causing a first pivotal altitude to be maintained about said target at a first fixed GPS co-ordinate;
    monitoring the data from the at least one optical sensor;
    nudging the surveillance vehicle to set up a second pivotal altitude about a second target at a second fixed GPS co-ordinate;
    monitoring the data from the at least one optical sensor; and
    optionally providing further nudges to provide further pivotal altitudes about a further target at a further fixed GPS co-ordinate, to provide a survey of the target area.

12. The method according to claim 11, wherein the launching, monitoring, and nudging are directed by one operator.

13. The surveillance vehicle according to claim 1, wherein the propulsion device includes an electric motor, integrated circuit motor, pyrotechnic rocket motor, chemical gas generator, or compressed gas.

14. The surveillance vehicle according to claim 1, wherein the spin inhibitor comprises a slipping obturator or deployable fin.

15. The surveillance vehicle according to claim 1, wherein the spin inhibitor comprises a wrap-around fin.

16. The surveillance vehicle according to claim 1, wherein the deployable wing is mounted at a fixed point on the pivotal trunion.

17. A data surveillance system comprising a grenade launcher, at least one grenade launched aerial surveillance vehicle having a trunion pivotally mounted to the surveillance vehicle and configured to pivot from a stowed position within a body of the vehicle to a deployed position that is exterior to the body of the vehicle, and further configured to pivot about a pitch axis passing through a center of gravity of the surveillance vehicle while in the deployed position, and a control device.

18. The system according to claim 17, wherein the control device is capable of post processing data from an optical sensor included in the at least one grenade launched aerial surveillance vehicle, such that there is image stabilisation applied to the data.

19. The system according to claim 17, wherein the at least one grenade launched aerial surveillance vehicle is configured with a nudge feature for steering the grenade launched aerial surveillance vehicle and that is invoked autonomously or by manual input from an operator by the control device configured to communicate with the at least one grenade launched aerial surveillance vehicle.

20. The system according to claim 17, wherein a first operative proximate to a target launches the at least one grenade launched aerial surveillance vehicle and a second operative at a remote location undertakes a survey of a target area.

* * * * *